Patented July 14, 1936

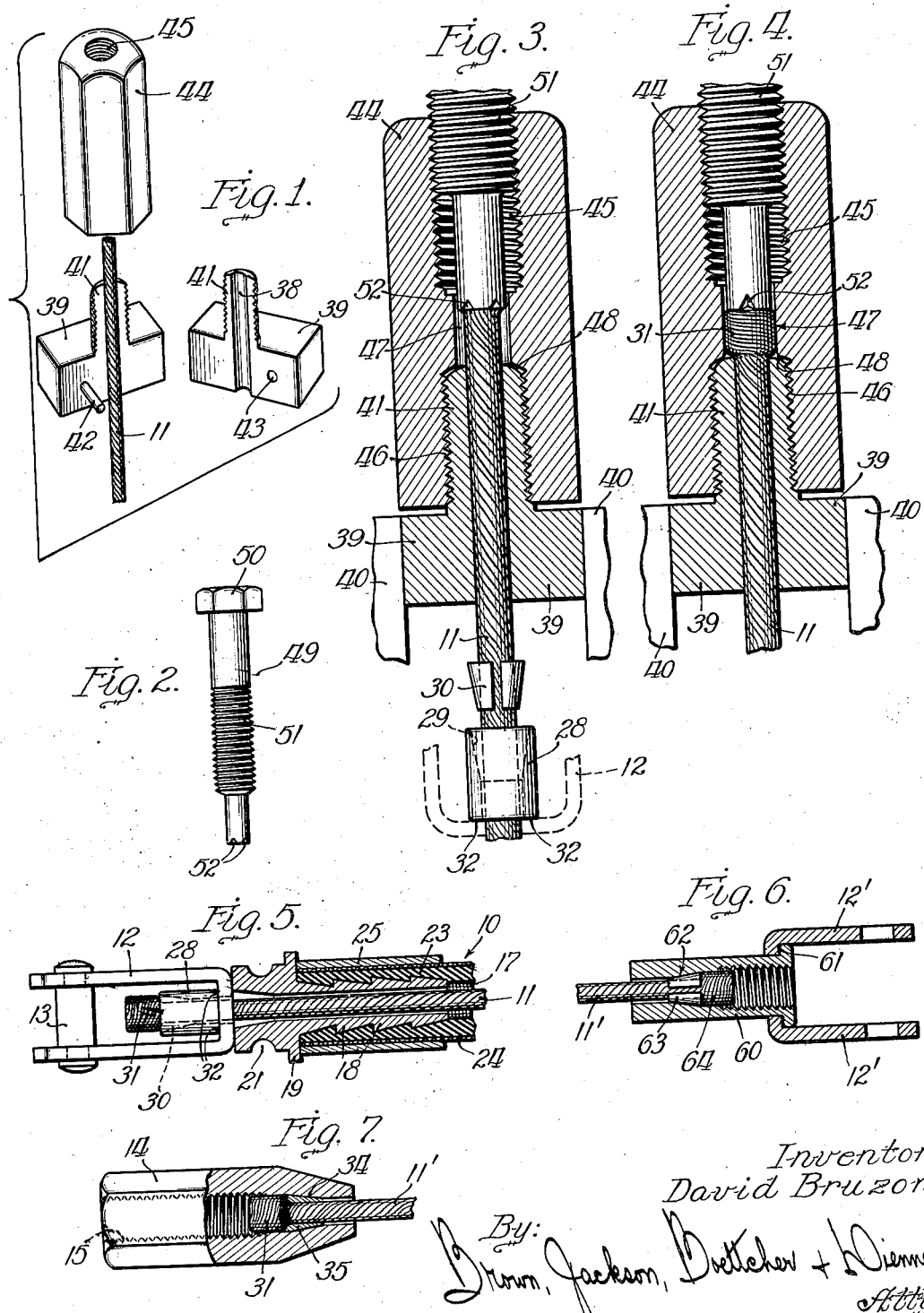

2,047,766

UNITED STATES PATENT OFFICE 2,047,766

FLEXIBLE CABLE UNIT AND METHOD OF APPLYING CONNECTING MEMBERS THERETO

David Bruzon, Chicago, Ill.

Original application November 17, 1933, Serial No. 698,422, now Patent No. 1,970,595, dated August 21, 1934. Divided and this application July 16, 1934, Serial No. 735,358

16 Claims. (Cl. 29—148)

This invention relates to flexible cable units for brake operating cable and conduit assemblies, and to a method of applying the yokes or other connecting members to the ends of such cable unit. Brake operating connections of this sort are connected between the frame of the car and the wheel, and consist of a flexible conduit or casing in which a flexible cable operates for actuating the brake from a brake pedal or other actuator and taking care of movement between the wheels and frame.

The present invention is particularly directed to the cable unit and the method of forming the same, and is a division of my copending application, Serial No. 698,422, filed November 17, 1933, which has matured into Patent No. 1,970,595, of August 21, 1934.

While the invention has been illustrated and described in connection with brake operating connections, it is to be understood that the invention is not limited to the particular brake operating connection or to the particulr connecting members illustrated and described. The present invention is not limited to use with cables for automobiles, but may be employed in connection with cables for boats, airplanes, or eleswhere as suitable and desired.

The application of these connecting members to flexible cable units of this sort has heretofore been difficult and costly. The usual method has been to swedge and spot-weld to the cable these connecting members or suitable collars for cooperation therewith to provide sufficient strength and permanency of the fastening of the connecting members or cooperating collars to the cable. This involves the use of large, costly presses, and other costly equipment, all of which has made the original assembly difficult and expensive. It has also rendered renewal or replacement of the cable unit equally difficult and expensive, with the result that, instead of making such renewal or replacement of the cable unit only, the prior cable and conduit assembly has usually been replaced wherever the cable unit is worn out or otherwise rendered unfit for further use.

The primary object of my present invention is to provide an improved cable unit, and particularly an improved connection between the connecting member and the end of the cable; and an improved method of applying such connecting member, all to the end of simplifying the connection and making the same less costly, whereby the formation of the connection and the renewal or replacement of the cable unit may be made without large costly presses or other costly equipment, and may be carried out by practically any brake service station attendant.

Other objects and advantages of my present invention will appear more fully from the following detailed description, which, taken in connection with the accompanying drawing, will disclose to those skilled in the art, the particular construction and method of forming a preferred embodiment of my invention.

In the drawing:

Figure 1 is an exploded perspective view of the cable gripping blocks and the tool receiving sleeve of the connecting member applying means;

Figure 2 is an elevational view of the tool for compressing and twisting the strands at the end of the cable;

Figure 3 is an enlarged vertical sectional view showing the tool for compressing, twisting and knotting the end of the cable at the beginning of the compressing, twisting and knotting operation;

Figure 4 is an enlarged section, similar to Figure 3, showing the compressing and twisting member at the end of the compressing and twisting operation;

Figure 5 is a fragmentary longitudinal section through one form of flexible brake operating connection showing one form of wheel connecting member connected to the cable in accordance with the present invention;

Figure 6 is a fragmentary view, partially in section and partially in elevation, showing another form of wheel connecting member connected to the cable in accordance with this invention; and Figure 7 is a fragmentary longitudinal section showing the frame connector at the opposite end of the cable of Figure 6 connected to the cable in accordance with the teachings of this invention.

Referring to the drawing, the device shown in Figure 5 is of the type more fully disclosed in my copending application, Serial No. 675,366, filed June 12, 1933. It comprises a flexible conduit designated in its entirety at 10, and a cable 11 extending through the conduit. The flexible conduit 10 constitutes the incompressible member of the device, and the cable 11 constitutes the inextensible tension element as well understood in the art.

The cable 11 is freely movable longitudinally in the conduit 10 and has, at one end, a yoke 12 extending between and secured in the arms of which is a rivet 13 for connection with the brake shoe operating means at the wheel. The opposite end of the cable 11 has a connecting member of usual form for threaded engagement with the adjacent pull rod of a brake actuating linkage on the frame of the vehicle.

The flexible conduit 10 comprises a spring 17, the turns of which are closely wound and maintained in contact with each other in all angular positions assumed by the conduit. The opposite ends of the spring 17 abut the adjacent ends of extending grooved necks, such as necks 18, formed integral with the end member 19 of the connection. The end member 19 has an annular groove 21 for attachment of this end member to the wheel. The spring 17 is covered by a relatively thick-walled flexible rubber tube 23, the end of which fits over the externally grooved neck extensions 18. The tube 23 may be covered with a thin woven, or other suitable fabric covering 24, and the ends of this covering are secured to the tube 23, and the ends of the tube 23 clamped securely upon the neck extensions 18 by metal clamping bands 25 contracted tightly about the ends of the conduit as by means of longitudinal crimps or the like, as disclosed in my Patent No. 1,970,595 of August 21, 1934.

The connecting member 12 includes the yoke part with the rivet 13 between the arms thereof and a collar part 28, the opening through which is tapered at 29 for coaction with the tapered periphery of a wedge 30, which wedge is interposed between the tapered bore of the collar 28 and the headed end 31 of the cable 11. The collar 28 may be separate from the yoke part of the connecting member 12 but, for convenience in handling, is preferably spot-welded thereto as indicated at 32. The headed end 31 is shown exposed beyond the end of the collar part 28, but it may be disposed within the collar part 28 within the scope of the present invention.

The wedge member 30 is preferably in the form of a longitudinally split collar externally tapered for cooperation with the taper inside the collar 28. The split collar is preferably formed of brass, copper, lead, or some other metal which is softer than the headed ends of the cable, and softer than the collar 28, so that, in operation, the relatively soft wedges are pressed into tight, secure engagement with the taper 29, and the enlarged cable end is pressed into tight, secure engagement and embedded in the relatively soft wedge member. The wedge members may, however, within the scope of the present invention, be of hard or relatively hard material.

In the use of flexible brake operating connections of this sort, I find that the cable 11 is the first part to wear out and render the device unfit for further use. Heretofore, because of the difficulty and apparatus required to apply the connecting members to the ends of such a cable, the entire device, including the flexible conduit, has usually been replaced.

With the present invention, however, the cable may be replaced by practically any brake service station attendant and without discarding the flexible conduit part and without a large press or other expensive apparatus. This is accomplished by merely severing the old cable and removing it from the conduit and dividing the new cable into the desired length. One end of this new cable 11 is then placed in grooves 38 (Fig. 1) in the inner faces of a pair of clamping blocks 39, which blocks 39 may be gripped, for example, in vise jaws 40, as shown in Figures 3 and 4. The jaws 40 clamp the cable 11 firmly in place between the blocks 39 with the upper end of the cable extending above the split and externally threaded neck part 41 at a distance sufficient to form the desired enlargement on the end of the cable. One half of the split and externally threaded neck part 41 is formed on one of the blocks 39 and the other half is formed on the other block. These blocks 39 are doweled together by engagement of a dowel pin 42 on one block in a dowel socket 43 in the other block.

A sleeve 44, formed externally to polygonal form or otherwise for engagement by a suitable wrench or other tool, has at its opposite ends coaxially threaded bores 45 and 46 connected by an intermediate bore 47. The cable end enlargement is formed in this intermediate bore 47, and its diameter therefore corresponds with the diameter of such cable end enlargement. With the end of the cable gripped between the blocks 39, the sleeve 44 is threaded down upon the split neck part 41 until the shoulder 48, within the sleeve, is firmly seated upon the upper end of the neck part 41. This positions the bore 47 adjacent the end of the cable which extends above the neck part 41.

The tool for deforming the cable end to enlarge the same and to twist and knot the wire strands of the cable tightly together at the enlargement, comprises a screw 49, headed at 50, for engagement by a wrench, and the shank of this screw 49 is threaded at 51 for threaded engagement in the upper threaded bore 45 of the sleeve 44. Below the threaded portion 51 the shank of the tool is reduced to a diameter to fit snugly in the bore 47, and the lower end of this reduced part of the shank has teeth or edges 52 adapted to bite into the end of the cable and to twist and knot together the strands of the cable as the tool is threaded down into the sleeve 44. The toothed or serrated formation at the inner end of the reduced part of the shank of the tool performs this twisting and knotting operation, and its particular formation is suitable for the purpose described, but may, of course, vary widely within the scope of the present invention.

The sleeve 44 may be applied by hand by means of a suitable wrench, and the tool 49 is, likewise, threaded into the sleeve 44 by hand as by means of a suitable wrench. As the reduced lower end of the tool enters the intermediate bore 47 it compresses the end of the cable above the neck part 41 ahead of it, and spreads the end strands of the cable out to the diameter of the bore 47 and compacts the enlargement down tightly upon the upper end of the neck part 41. Simultaneously with this spreading and axial compressing of the end of the cable the edges 52, in the end of the tool, bite into the end of the cable and twist and knot tightly together the strands of the cable at the enlargement 31. This twisting and knotting of the strands of the cable together at the enlargement secures the same against opening under the pulling stresses in the operation of the cable on the car and greatly enhances the holding power of the enlargement.

With the enlargement 31 thus formed on one end of the cable, the wedge member, such as the wedge member 35 shown in Figure 7, is slipped slipped into place over the opposite end of the cable and the connecting member 14, for example, is then slipped into place over the opposite end of the cable. The enlargement 31 forces the wedge into the tapered socket 34 upon axial tensioning of the cable. With the enlargement 31 thus formed and the connecting member 14 and intervening wedge 35 applied, the cable is passed through the conduit means 10, whereupon the connecting member 12 and wedge 30 are slipped over the opposite end of the cable, which end is then gripped between the blocks 39 beyond the wedge 30 and deformed by the tool 49 to form a second enlargement 31 and to twist and knot the strands of the cable together at the second enlargement 31 in the manner described in connection with the formation of the first enlargement 31. This completes the application of the new cable unit, and it will be apparent from the foregoing description that the end members 12 and 14 are applied to the ends of the cable 11 by hand with simple and inexpensive tools and without large costly presses or other expensive equipment. The attachment of these cable ends in accordance with this invention will withstand a pull of at least 2800 pounds without pulling out the enlargement or pulling off the connecting member.

The blocks 39 are preferably not of great height so that they may be clamped upon the end of the cable with the conduit means on the cable and with the clearance usually provided between the connecting members and the ends of the conduit means.

Where this clearance is not so great, the sleeve part 44 may be omitted, and a threaded socket may be formed directly in the clamping blocks 39, as described in connection with my Patent No. 1,970,595 of August 21, 1934.

In Figure 6 I have shown another form of connecting member, indicated at 12', for attachment to the brake actuating mechanism at the wheel, with another form of connecting member 14 at the opposite end of the cable for attachment to the brake actuating linkage on the frame of the vehicle. The member 12' comprises the yoke part and a thimble 60 having a shank portion passing through an opening in the base of the yoke part and a headed end which may be spot-welded, as at 61, to the base of the yoke part. The opening through the thimble 60 is tapered at 62 for engagement with the externally tapered and longitudinally split wedge sleeve 63 which is interposed between the taper 62 inside the thimble 60 and the headed enlargement 64 at the end of the cable 11', this headed enlargement 64 being formed in the manner previously described.

The connecting member 14 at the opposite end of the cable 11' is adapted for connection to the brake operating means on the frame of the vehicle, and the opening therethrough is tapered at 34 for cooperation with the wedge member 35 interposed between the taper 34 and the enlarged end 31 of the cable, and beyond the taper 34 the opening through the member 14 is threaded at 15 for threaded engagement with the adjacent pull rod of the brake actuating means on the frame.

It is therefore apparent that the present invention provides a readily replaceable cable connecting unit, which may be easily formed with inexpensive tools, and by a method not requiring expensive or costly equipment. The particular method of applying the connecting members is of distinct advantage in reducing the original cost of the cable or connecting unit, and in reducing the cost of replacement or repair, since this replacement or repair may be carried out by any brake service station attendant or the like with no expensive equipment and with a minimum of time required for the operation.

Having described my invention in accordance with the patent statutes, what I claim as new and desire to secure by Letters Patent is:

1. The method of applying a connecting member to a cable, which comprises placing the connecting member upon the cable, compressing and twisting the outer strands at the end of the cable beyond the connecting member to form a cylindrical enlargement with the strands of the cable twisted and knotted together at said enlargement, and then wedging said enlargement into said connecting member.

2. The method of forming a cable unit for a flexible brake connection, which comprises dividing a cable into the desired lengths, placing a connecting member upon the cable, gripping the cable beyond said connecting member, deforming the end of the cable beyond the connecting member to form an enlargement on the end of the cable by simultaneous axial compression and rotation to twist and knot the outer strands of the cable tightly together at said enlargement, and drawing said cable through said connecting member to wedge said enlargement therein.

3. The method of applying a flexible cable unit to a flexible brake connection having conduit means, which comprises dividing a cable into the desired length, compressing and twisting one end of the cable to form an enlargement with the strands of the cable twisted and knotted together at said enlargement, loosely placing a connecting member upon the cable, passing the cable through the conduit means, placing a second connecting member loosely upon the opposite end of the cable, gripping the cable beyond said second connecting member, compressing and twisting said end of the cable beyond said second connecting member to form an enlargement with the strands of the cable twisted and knotted together at said enlargement, and forcing said connecting members outwardly along said cable to move said enlargements into locking engagement therewith.

4. A step in the method of applying a connecting member to a stranded cable, which comprises compressing the end of the cable to form an enlargement for holding the connecting member against removal from the cable, and simultaneously with the formation of said enlargement engaging the individual outer strands of said cable at the end thereof for rotating, twisting and knotting together said strands of the cable at said enlargement.

5. A step in the method of applying a connecting member to a stranded cable, which comprises gripping the cable at a distance from one end to leave the end of the cable projecting beyond said gripping means, separately engaging different portions of the strands of said cable at the ends thereof for rotation, and compressing and twisting the projecting portions at the end of the cable towards said gripping means to form an enlargement with the strands of the cable twisted and knotted together at said enlargement.

6. A device of the class described, comprising a cable, a connecting member on said cable, said connecting member having a tapered socket, the end of said cable beyond said connecting member being deformed to form a cylindrical rigid enlargement with the strands of the cable twisted and knotted together at said enlargement, and a deformable metallic wedge member on said cable between the connecting member and the enlargement and forced into said socket by axial pull on said cable, said wedge member being formed to grip said enlargement and to form an abutment therefor within the socket.

7. The method of applying a connecting member having a recessed socket to a cable, which comprises placing the connecting member loosely upon the cable, gripping the end of said cable exteriorly of said member, compressing the gripped end of the cable beyond the connecting member to form an enlargement for preventing displacement of the connecting member from the cable, and drawing said member along said cable toward said enlargement to force said enlargement into locking engagement within said socket.

8. The method of mounting a connecting member upon a stranded cable which comprises loosely slipping said connecting member over one end of said cable, gripping the cable intermediate said end and said connecting member, compressing said end of said cable to form an enlargement thereon and simultaneously twisting and knotting at least the outer strands of said cable at said enlargement to prevent deformation of said enlargement, removing the grip upon said cable, and moving said connecting member outwardly of said cable to wedge said enlargement within said connecting member.

9. The method of forming a flexible brake connection, which comprises dividing a flexible stranded cable into predetermined lengths, gripping said cable adjacent one end thereof, compressing and twisting the strands of said cable to form an enlargement on said end, said strands being simultaneously knotted together, slipping a connecting member over the other end of said cable and outwardly along said one end of said cable to produce locking engagement of said enlargement therein, slipping a second connecting member over said other end of said cable, gripping said cable between said other end and said second connecting member, and forming a corresponding twisted enlargement at said other end to prevent outward displacement of said second connecting member.

10. In a device of the class described, a cable having a bushing provided with a tapered socket, a split wedge member on said cable and seated in said socket, and a preformed rigid enlargement of twisted and knotted strands of cable compressed into cylindrical form on the cable at the end of said wedge member.

11. The method of forming a cable unit for a flexible connection which comprises gripping the lateral surface of a stranded cable adjacent one end thereof, engaging individual outer strands of said cable for rotation, and simultaneously rotating said outer strands to twist the same and axially compressing the end of said cable to form a hard cylindrical enlargement of twisted and knotted strands at the ends of said cable.

12. The method of applying a connecting member to a flexible cable which comprises gripping said cable adjacent one end to support the end of said cable within a cylindrical compression chamber, simultaneously engaging the outer strands of said cable for rotation and twisting and axially compressing said end of said cable to form a rigid cylindrical enlargement at said end of a diameter equal to the diameter of said chamber, and then slipping said connecting member axially of said cable into abutting engagement with said enlargement.

13. The method of preparing a stranded cable for a flexible brake connection which comprises gripping the lateral surface of said cable adjacent one end thereof, engaging the ends of the outer strands of said cable for rotation, and simultaneously rotating and twisting said strands and axially compressing said cable to form a predetermined cylindrical enlargement at the end of said cable.

14. In a device of the class described, a cable having a bushing mounted thereon and having a tapered socket extending axially of said cable outwardly toward one end thereof, a deformable metallic wedge member on said cable and adapted to seat in said socket, and a preformed rigid cylindrical enlargement at the end of said cable formed by twisting the strands at the end of said cable under axial compression engaged by said wedge member for preventing withdrawal of said bushing outwardly over said end of said cable.

15. In a device of the class described, a cable having a bushing provided with a socket, a split wedge member on said cable and seated in said socket, and a pre-formed rigid enlargement of twisted and knotted strands of cable compressed into generally cylindrical form on the cable at the end of said wedge member.

16. In a device of the class described, a cable having a bushing mounted thereon and having a socket extending axially of said cable outwardly toward one end thereof, a deformable metallic wedge member on said cable and adapted to seat in said socket, and a pre-formed rigid and generally cylindrical enlargement at the end of said cable formed by twisting the strands at the end of said cable under axial compression engaged by said wedge member for preventing withdrawal of said bushing outwardly over said end of said cable.

DAVID BRUZON.